April 5, 1949.  J. H. NORMAN  2,466,121
VEGETABLE CUTTER HAVING STATIONARY PARALLEL
BLADES AND A PIVOTED PUSHER
Filed Feb. 20, 1946
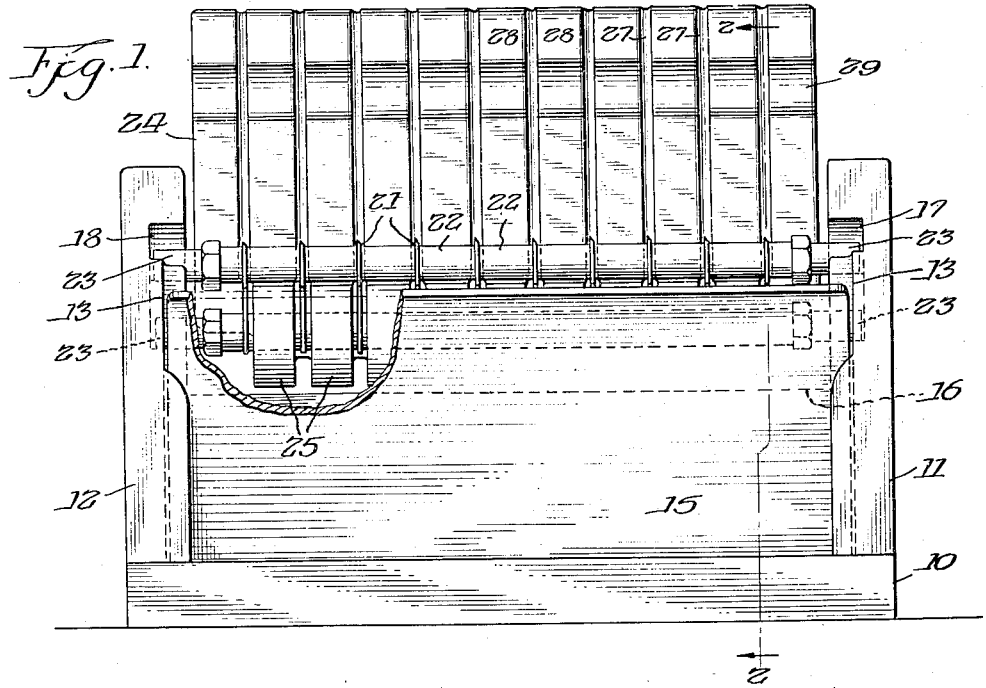
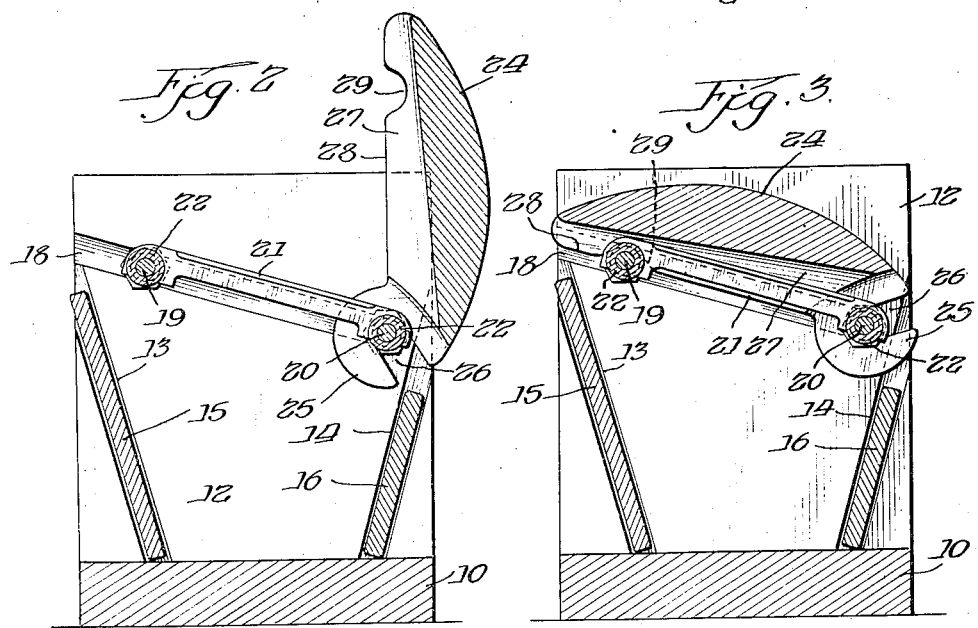
Inventor:
John H. Norman
By Wilkinson Hurley Byron Knight
Attys.

Patented Apr. 5, 1949

2,466,121

UNITED STATES PATENT OFFICE 2,466,121

VEGETABLE CUTTER HAVING STATIONARY PARALLEL BLADES AND A PIVOTED PUSHER

John H. Norman, Elmhurst, Ill.

Application February 20, 1946, Serial No. 648,941

5 Claims. (Cl. 146—169)

My invention relates to a hand operated vegetable cutter, and has particular reference to a device for use in cutting vegetables such as green beans, celery, carrots and the like, to suitable lengths for quick and easy cooking or for use in salads, and can be easily and quickly operated to accomplish this result without the use of a single knife, which is common in cutting vegetables for this purpose, and in which a number of such vegetables, such as string beans and carrots, can be placed in the device at one time and quickly severed into lengths, thus enabling the operation to be more quickly and easily performed than is common at the present time.

Another and further object of my invention is a hand operated vegetable cutter which is so constructed that the vegetables, after being cut, can be easily and quickly taken from the device and emptied into a kettle or other receptacle so that the operation of cutting them is quickly and easily performed.

Still another object of my invention is the provision of a vegetable cutter which is so constructed that all of the parts can be quickly disassembled for cleaning and washing purposes, and when so disassembled, can be easily and quickly cleaned by immersing the parts in water and using the ordinary kitchen procedure, which adds materially to the usefulness of the device in that so many devices of a similar character are difficult to assemble and to disassemble for cleaning purposes so that little time is saved in the use when the cleaning operation is taken into account.

Another and further object of my invention is the provision of a hand operated cutting device in which the opportunity for pieces of the cut vegetables to lodge in the machine is reduced to a minimum, thereby eliminating one of the faults common to vegetable cutters of this type.

These and further objects of my invention will be better and more fully understood by reference to the accompanying drawings, and in which Figure 1 is a front elevational view of a cutter with the cover plate in open position and a portion of the front wall of the receptacle cut away to better illustrate the structure of the cover;

Figure 2 is a sectional view on lines 2, 2 of Figure 1; and

Figure 3 is a sectional view on the same line as Figure 2, showing the cover in closed position.

Referring now specifically to the drawings, and in which like character references refer to like parts, a receptacle is shown comprising a bottom member 10, end members 11 and 12 secured to the bottom member 10 in any approved manner, each of the end members 11 and 12 having front channels 13, 13 and rear channels 14, 14 therein extending generally in a vertical direction but inclined towards each other at their bottoms, and with a removable front wall member 15 fitted into the channels 13, 13 at each of its ends with its lower edge resting upon the bottom member 10, while a rear wall member 16 is provided which is fitted at each of its ends into the channels 14, 14, the end members 11 and 12 together with the front and rear wall members 15 and 16, respectively, forming a receptacle into which the cut vegetables drop after passing through the cutting frame as hereinafter described. Channels 17 and 18 are provided in the end walls 11 and 12 which extend partially thereacross and which are open at their front ends and closed at their rear ends and extend generally in a horizontal direction although inclined from front to rear, particularly as shown in Figures 2 and 3 of the drawings.

A cutting frame is provided which is mounted in the channels 17 and 18 and which comprises a pair of rods 19 and 20 in spaced parallel relation with each other and which have a plurality of parallel extending spaced knives 21, 21 mounted at each of their ends on the rods 19 and 20, with spacers 22, 22 fitted over the rods 19 and 20, respectively, each of the rods 19 and 20 having nipples 23, 23 on each of their ends and preferably in threaded engagement with the rods 19 and 20 so they can be turned up tight to hold the knives 21, 21 in fixed relation in the cutting frame, with the nipples extending outwardly a sufficient distance so that they are removably placed into the channels 17 and 18 in the end members 11 and 12, and when so fitted into this position are held therein by reason of the closed ends of the channels 17 and 18 at their rear ends and are generally in an inclined position, as shown particularly in Figures 2 and 3.

A cover plate 24 is provided having a curved top and having a circular trunnion portion 25 along one side thereof, the trunnion portion 25 having a longitudinally extending channel 26 therein which allows the cover member to be fitted over and removed from the spacers 22, 22 carried by the rod 20. The cover 24 has a series of transversely extending grooves 27, 27 therein which extend across the entire underside of the cover, including the trunnion portion, thereby providing portions 28, 28 on the underside of the member 24 which pass between the knives 21, 21, thereby serving to push the vegetables against the knives and also to push the cut sections of the vegetables from between the knives, as they would adhere thereto because of the friction produced between the ends of the cut portions and the sides of the knives so that they are pushed completely through between the knives and dropped into the receptacle below the cutting frame. The cover 24 has a longitudinally extending channel 29 near the front edge thereof, into which the spacers 22 around the rod 19 are received when the cover 24 is placed into a completely closed position over the cutting frame, as shown particularly in Figure 3. The channels 17 and 18, as well as being angularly positioned, are placed intermediate the ends of the members 11 and 12, but spaced from the top thereof so that a receptacle is provided above the cutting frame for the reception of the vegetables and the like to be cut to suitable lengths, depending upon the spacing of the knives. Various spacing of these knives can be accomplished by providing frames having the knives spaced closer or farther apart for various purposes, or several sets of these cutting frames can be provided so that they can be removed and inserted into the device for cutting vegetables to various lengths.

In operation, the device is simple in that after the vegetables have been cleaned and are ready to be cut, they are placed lengthwise of the knife frame with the cover in open position, as shown in Figures 1 and 2, and the operator, by merely closing the cover and pushing it downward, cuts the vegetables into lengths measured by the distance the knives are spaced apart. Due to the angular position of the cutting frame as the cutter descends thereon, a slicing or angular cut is made through the material being cut, which makes the cutting of the vegetables easier to accomplish than if the cutting action of the knives were straight across the vegetables, while the rounded surface of the trunnion 25 prevents the lodging of pieces of the vegetables against the cover, and as the cover is closed, they are pushed out along the knife edges until they are gripped by the knife surface to be cut to suitable lengths.

After the device has been used, and when it is desired to clean it, the cover 24 can be lifted from its position, the cutting frame can be removed bodily by pulling it out of the slots 17 and 18, and the front wall member 15 or rear wall member 16 can be removed so that the cut vegetables can be emptied into a pan, or some other receptacle for cooking purposes, easily and quickly by the user. With the machine in disassembled relation, all of the parts can be easily and quickly cleaned, dried, and put back together for future use, or the parts put away until the machine is desired to be put into use again.

While I have shown certain preferred embodiments of my invention, these are to be understood as illustrative only as it is capable of variation to meet differing conditions and requirements, and I contemplate such modifications as come within the spirit and scope of the appended claims.

I claim:

1. A hand operated vegetable cutter comprising in combination a receptacle having a bottom member and fixed end members and removable front and rear side panels, the end members having transversely extending inclined channels therein open at one side of the receptacle and closed at the other, a cutting frame having a plurality of spaced knives therein and projecting portions at each of its ends adapted to be fitted into the channels in the end members and a combined cover and pusher hingedly secured to said cutter frame at one side thereof, having transversely extending slots therein of a number equal to the number of the knives in the cutter frame and in register therewith.

2. A hand operated vegetable cutter comprising in combination a receptacle having a bottom member and fixed end members and removable front and rear side panels, the end members having transversely extending inclined channels therein open at one side of the receptacle and closed at the other, a cutting frame having a plurality of spaced knives therein and projecting portions at each of its ends adapted to be fitted into the channels in the end members and a combined cover and pusher having a trunnion portion at one side thereof, the said trunnion having an open channel therein, the said cover and pusher having a plurality of transverse slots therein extending across the under face thereof and across the trunnion portion of the cover, whereby the said cover is removably secured to the said cutter frame.

3. A hand operated vegetable cutter comprising in combination a receptacle having a bottom member and fixed end members and removable front and rear side panels, the end members having transversely extending inclined channels therein open at one side of the receptacle and closed at the other, a cutting frame having a plurality of spaced knives therein and projecting portions at each of its ends adapted to be fitted into the channels in the end members and a combined cover and pusher having a trunnion portion at one side thereof, the said trunnion having an open channel therein, the said cover and pusher having a plurality of transverse slots therein extending across the under face thereof and across the trunnion portion of the cover, whereby the said cover is removably secured to the said cutter frame, the said slots corresponding in number with the knives in the cutter frame and being in register therewith.

4. A vegetable cutter comprising in combination a receptacle consisting of a bottom, end members fixed to said bottom member at each end thereof, each of said end members having angularly disposed channels therein extending partially thereacross intermediate their top and bottom ends and each end member having a plurality of vertically disposed channels therein along their front and rear edges and front and rear side members loosely fitted at each of their ends in said vertically disposed channels whereby a receptacle is formed, a rectangular shaped knife holding frame removably mounted in said angularly disposed channels in the end members, knives in said frame and a combined cover and pusher removably hinged to the said knife holding frame having channels therein into which the said knives are received.

5. A vegetable cutter comprising in combination a receptacle consisting of a bottom, end members fixed to said bottom member, each of said end members having angularly disposed channels therein extending partially thereacross intermediate their top and bottom ends and each end member having a plurality of vertically disposed channels therein along their marginal edges and front and rear side members loosely fitted in said vertically disposed channels whereby a receptacle is formed, a rectangular shaped knife holding frame removably mounted in said angularly disposed channels in the end members, knives in said frame and a combined cover and pusher removably hinged to the said knife holding frame having channels therein into which the said knives are received, the angularly disposed channels in the end members being intermediate the top and bottom of the ends whereby the end members form a closure for the receptacles above and below the knife holding frame.

JOHN H. NORMAN.

REFERENCES CITED

The following references are of record in the file of this patent:

UNITED STATES PATENTS

| Number | Name | Date |
|---|---|---|
| 653,514 | Kassachau | July 10, 1900 |
| 1,021,968 | Bush | Apr. 2, 1912 |
| 1,252,744 | Tsuruoka | Jan. 8, 1918 |
| 1,296,102 | Miller | Mar. 4, 1919 |
| 1,599,346 | Purkey | Sept. 7, 1926 |

FOREIGN PATENTS

| Number | Country | Date |
|---|---|---|
| 747,115 | France | Mar. 21, 1933 |
| 805,982 | France | Sept. 14, 1936 |
| 452,281 | Germany | Nov. 8, 1927 |